United States Patent [19]

Shiraki et al.

[11] Patent Number: 4,724,350
[45] Date of Patent: Feb. 9, 1988

[54] 1-PHASE SELF STARTING DISK-TYPE BRUSHLESS MOTOR WITH COGGING ELEMENT

[75] Inventors: Manabu Shiraki; Osami Miyao, both of Kanagawa, Japan

[73] Assignee: Shicoh Engineering Co., Ltd., Kanagawa, Japan

[21] Appl. No.: 909,720

[22] Filed: Sep. 22, 1986

[51] Int. Cl.$^4$ ............................................. H02K 21/14
[52] U.S. Cl. ..................................... 310/268; 310/156
[58] Field of Search ............... 310/68 R, 254, 268, 310/67 R, 156

[56] References Cited

U.S. PATENT DOCUMENTS 3,840,761  10/1974  Muller .............................. 310/49 R Primary Examiner—Patrick R. Salce
Assistant Examiner—D. L. Rebsch
Attorney, Agent, or Firm—Wegner & Bretschneider

[57] ABSTRACT

A 1-phase disk-type brushless motor comprises a cogging-generating magnetic member or plate having a width substantially equal to the width of each pole of a magnet rotor and located at a specific position on a stationary printed circuit board so that the magnet rotor may stop with one pole thereof just opposed to the magnetic member, thereby assuring self-starting of the motor. The cogging generating magnetic member is shaped such that the volume or area may gradually decrease forwardly relative to the direction of rotation of the motor so that the cogging torque generated by the magnetic member may gradually increase upon starting of the motor, thereby assuring smooth rotation of the motor.

3 Claims, 15 Drawing Figures

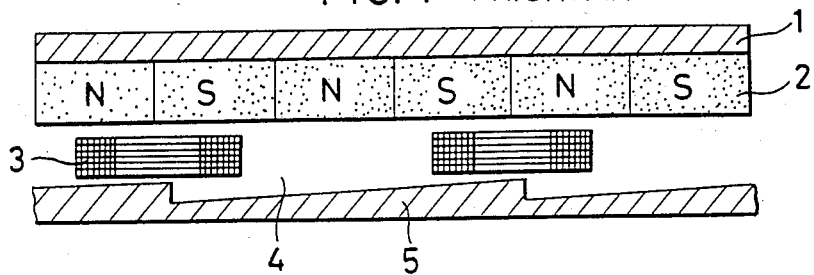
FIG. 1- PRIOR ART
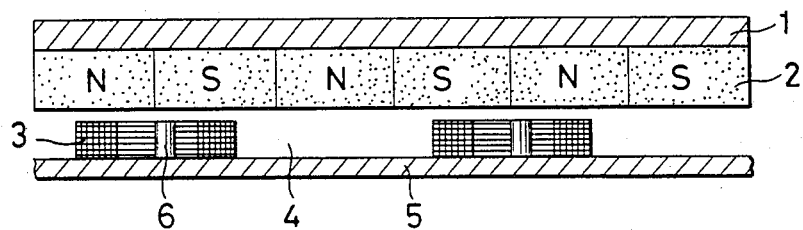
FIG. 2- PRIOR ART
FIG. 3
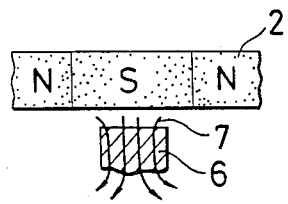
FIG. 4
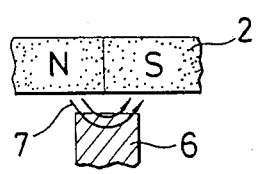
FIG. 5
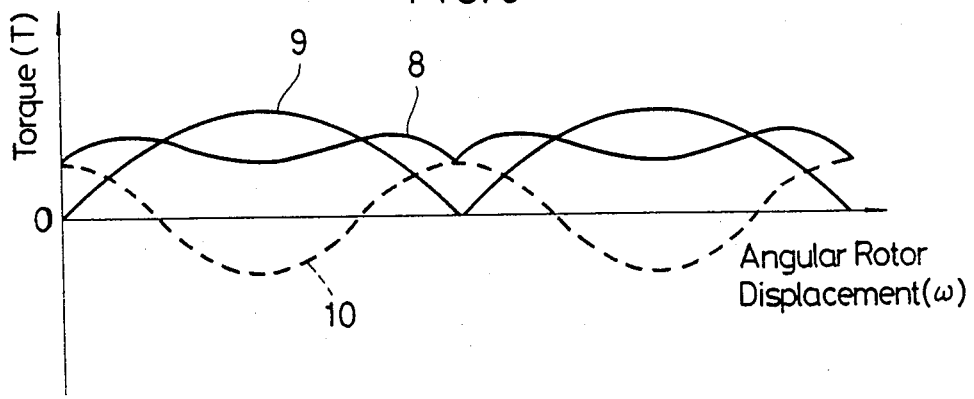

4,724,350

1-PHASE SELF STARTING DISK-TYPE BRUSHLESS MOTOR WITH COGGING ELEMENT

BACKGROUND OF THE INVENTION

1. Field of the Invention

This invention relates to a 1-phase energized disk-type brushless motor having a single position detecting element.

2. Description of the Prior Art

As various systems have been developed, brushless motors, especially disk-type brushless motors, suitable for use with such systems, have been demanded. Disk-type brushless motors can be used as disk-type brushless fan motors which are widely used in office machines and the like, and in some applications, they are required to be very inexpensive, small and very flat.

Those motors which meet the requirements best are 1-phase energized brushless motors wherein only one position detecting element is required. It is to be noted that while a motor of the type is sometimes called a 2-phase motor from the number of armature coils (for example, 2, 4, etc.), it should be called exactly a 1-phase motor from the energizing method. However, such a 1-phase (single phase) motor has a dead point at an energization switching point at which the motor provides zero torque. Accordingly, the 1-phase motor has a drawback that it cannot start itself if the rotor position upon starting of the motor is just at a dead point and hence the position detecting element detects a boundary between the N (north) pole and the S (south) pole of the magnet rotor, that is, the dead point.

Accordingly, a 1-phase motor normally includes a cogging generating magnetic member (an iron piece is used therefor) foro generating a torque (cogging torque) in addition to a torque generated by an armature coil and a magnet rotor in order to eliminate such dead points to allow self-starting of the motor.

In a coreless motor, for example, following methods for generating a cogging torque are known. Referring first to FIG. 1, a 6-pole magnet rotor (field magnet) 2 having an alternate arrangement of the 6 north and south poles is mounted on a rotor yoke 1 in an opposing relationship to a stator yoke 5 with an air gap 4 left therebetween and with a pair of coreless armature coils 3 disposed in the air gap 4. In the motor of FIG. 1, the stator yoke 5 has at a fact thereof opposing the magnet rotor (hereinafter referred to as field magnet) 2 two inclined surfaces which thus define the complementarily inclined air gap 4. This method, however, has a drawback that the efficiency is relatively low because the air gap is relatively great.

Referring now to FIG. 2, another method is illustrated. In the motor of FIG. 2, a stator yoke 5 has no such inclined faces are provided on the stator yoke 5 of FIG. 1. Instead, an iron bar 6 is mounted on the stator yoke 5 and extends through each of a pair of coreless armature coils 3 disposed in a uniform air gap 4 defined by the stator yoke 5 and a field magnet 2 on a rotor yoke 1. According to this arrangement, a magnetic flux will appear as seen in FIG. 3 and hence the field magnet 2 will stop at a position in which the iron bars 6 are each opposed to the center of one of the N and S poles of the field magnet 2. Accordingly, if the armature coils 3 are located so as to produce a rotational torque in such a stopping position of the field magnet 2, a coreless motor which can start itself will be obtained.

However, the method as shown in FIG. 2 has a drawback that if the thickness of the iron bars 6 is increased in order to increase the cogging torque, a phenomenon that the torque around dead points decreases will appear because a magnetic flux 7 will act as shown in FIG. 4 around the dead points.

SUMMARY OF THE INVENTION

It is an object of the present invention to provide a 1-phase energized disk-type brushless motor which can provide a cogging torque having a sufficient magnitude and showing an ideal torque-angular rotor displacement curve.

It is another object of the invention to provide a 1-phase energized disk-type brushless motor wherein a cogging torque is generated progressively, and hence the rotor can be rotated very smoothly, with turning noises reduced.

It is a further object of the invention to provide a 1-phase energized disk-type brushless motor which has a built-in energization controlling circuit for controlling the motor.

In order to attain the objects, according to the present invention, there is provided a 1-phase energized disk-type brushless motor of the type which does not include a stator yoke, comprising: a magnet rotor having 2P (P is an integer equal to or greater than 1) alternate magnetic north and south poles; a stator armature including one or more coreless armature coils located at same phase positions without overlapping each other on a printed circuit board which is disposed in an opposing face-to-face relationship to said magnet rotor with an axial air gap left therebetween; a single position-detecting element located on said printed circuit board for detecting a magnet pole of said magnet rotor; and a cogging generating magnetic member having a width equal to or substantially equal to the width of each pole of said magnet rotor and located on said printed circuit board such that the center radial line between the width thereof is spaced by a distance equal to about three fourths of the width of pole width of said magnet rotor from a position at which a maximum starting torque can be generated; said cogging generating magetic member being shaped such that the volume or area thereof gradually increases in the direction of rotation of said magnet rotor.

BRIEF DESCRIPTION OF THE DRAWINGS

FIG. 1 is a developed illustrative view of a rotor and a stator of a 1-phase coreless-type brushless motor illustrating a conventional means for generating a cogging torque;

FIG. 2 is a similar view but illustrating another conventional means for generating a cogging torque;

FIG. 3 is an illustrative view of part of the motor of FIG. 2 illustrating a stopping position of the rotor;

FIG. 4 is a similar view illustrating a magnetic flux around a dead point of the motor of FIG. 2;

FIG. 5 is a graph showing a torque-angular rotor displacement curve of a 1-phase disk-type brushless fan motor according to the present invention;

DESCRIPTION OF THE PREFERRED EMBODIMENTS

In order to obtain an ideal torque-angular rotor displacement curve, it is necessary to obtain a composite torque curve 8 as shown in FIG. 5. In FIG. 5, an armature coil torque curve by an armature coil is indicated by a curve 9 while a cogging torque curve by a cogging generating magnetic member is indicated by a curve 10. As apparent from the armature coil torque curve 9 and the cogging torque curve 10, preferably the cogging torque should be half of the armature torque in magnitude. By this, the torque curve 8 composite of the armature coil torque and the cogging torque exhibits a substantially uniform rotational torque over the entire range of rotation.

In order to obtain such an ideal composite torque curve 8, a cogging magnetic member must be designed correctly in size and location, and the present invention can provide such an ideal composite torque curve 8. Besides, since the cogging torque curve 10 rises moderately, the motor will rotate smoothly.

Now, a disk-type brushless motor according to a first embodiment of the invention will be described with reference to FIGS. 6 to 11. The motor shown is constructed as a 1-phase disk-type brushless fan motor having a single position-detecting element, two coils and a field magnet having 4 poles, but otherwise if the motor has only one coil, it can be driven in a similar principle.

Figure 6:
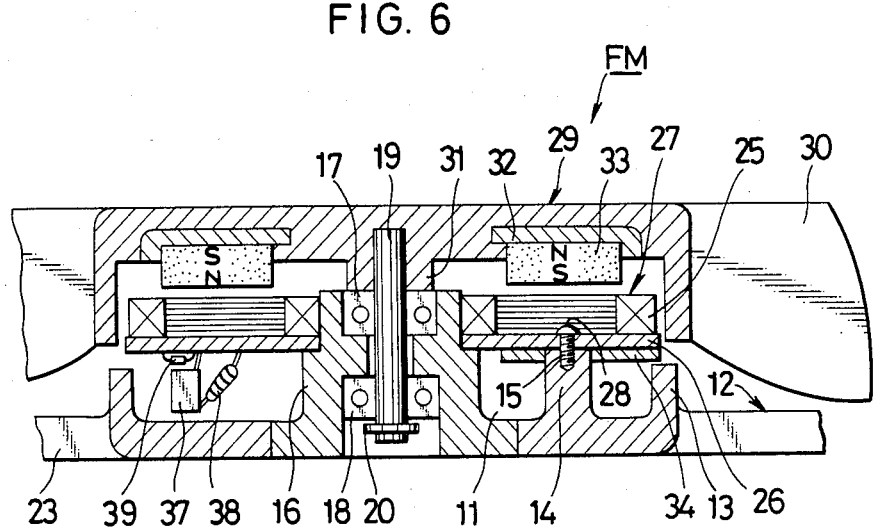
FIG. 6 is a vertical sectional view of a disk-type brushless fan motor according to a first embodiment of the invention.
Figure 7:
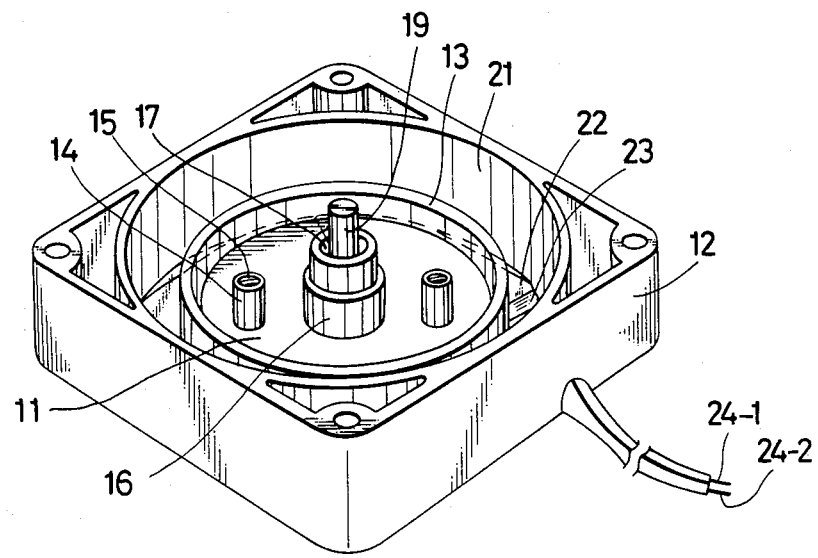
FIG. 7 is a perspective view, in a somewhat reduced scale, of a case of the fan motor of FIG. 6.

Referring first to FIGS. 6 and 7, the disk-type brushless fan motor generally designated at FM includes an angular case 12 which is made of, for example, plastic material and generally flattened in its axial direction. The case 12 has at a central portion thereof an integral, generally cup-shaped motor casing 13 defining therein a recessed spacing 11. The recessed spacing 11 of the motor casing 13 can accommodate therein electric parts of an energization controlling circuit as hereinafter described, which allows disk-type brushless motors or disk-type brushless fan motors of a good performance to be produced with simplified mass-production steps and at a reduced cost.

A pair of posts 14 are formed integrally on and extend uprightly from the bottom of the casing 13, and each have a threaded hole 15 formed at the top thereof. A bearing housing or hub 16 is formed at the center of and also extends uprightly from the bottom of the casing 13, and a pair of journal bearings 17, 18 are located in a pair of openings at the upper and lower ends of the bearing housing 16. A rotary shaft 19 extends through a center bore of the bearing housing 16 and is supported for rotation substantially at the center of the disk-type brushless fan motor FM by means of the journal bearings 17, 18. An E-snap ring 20 is mounted adjacent the bottom end of the rotary shaft 19 so that the shaft 19 may not be pulled off upwardly.

A spacing 21 is formed between the case 12 and the casing 13, and the case 12 and the casing 13 are interconnected by means of stays 23 with air inlet windows 22 left therebetween. A positive power cord 24-1 and a negative power cord 24-2 extend from the case 12 for electric connection with an external power supply.

A stator armature 27 includes a pair of armature coils 25-1, 25-2 and a printed circuit board 26 on an upper face of which the armature coils 25-1, 25-2 are mounted. The stator armature 27 is securely mounted at the top of the posts 14 by means of screws 28 made of a nonmagnetic material and screwed into the threaded holes 15 at the top of the posts 14 by way of perforations 36 formed in the printed circuit board 26. The aramature coils 25-1, 25-2 are located in a symmetrical relationship relative to the center of the printed circuit board 26 and hence of the motor FM, or in other words, in an angularly displaced relationship by 180 degrees around the center of the motor FM, as seen in FIG. 9.

Figure 8:
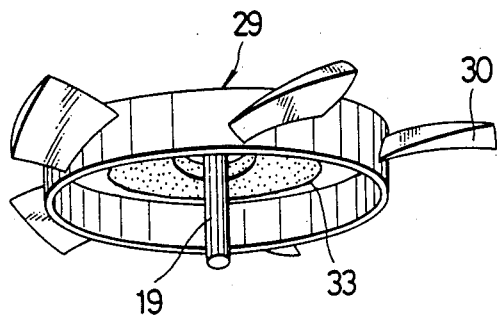
FIG. 8 is a perspective view of a cup member with fan blades of FIG. 6.
Figure 10:
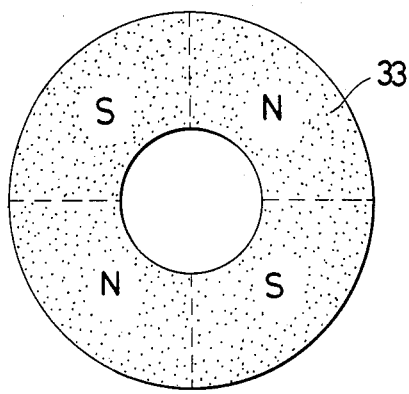
FIG. 10 is a bottom plan view of a 4-pole field magnet.

Above the stator armature 27, a cup member 29 is mounted for rotation in a parallel opposing relationship. The cup member 29 is made of plastic material and generally flattened in an axial direction thereof as seen in FIG. 8, and has several fan blades 30 integrally formed on an outer periphery thereof. A hub 31 is integrally formed substantially at the center of an inner or lower face of the cup member 29, and the rotary shaft 19 is securely fitted in the hub 31 of the cup member 29 for integral rotation with the latter. An annular rotor yoke 32 is securely mounted on the inner face of the cup member 29. An annular 4-pole field magnet 33 having four alternate N and S magnet poles as shown in FIG. 10 is securely mounted on a lower face of the rotor yoke 32 in an opposing relationship to the stator armature 27.

Figure 9:
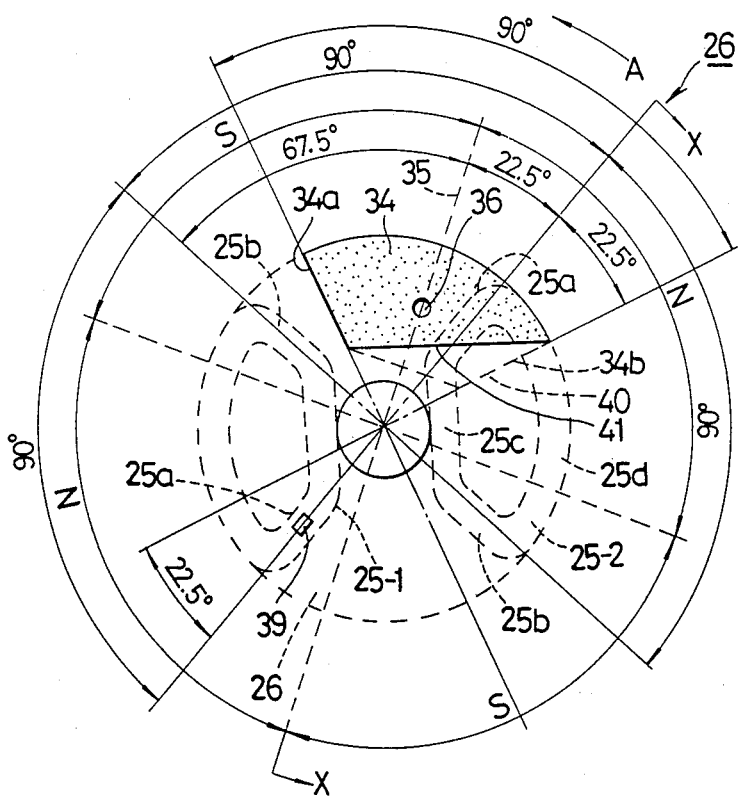
FIG. 9 is a bottom plan view of a stator armature of the embodiment of FIG. 6.

The two armature coils 25-1, 25-2 are located at spaced symmetrical positions on a face of the printed circuit board 26 opposing the field magnet 33 as described above and are approximately sector-shaped such that magnetically active conductor portions 25a and 25b thereof which contribute to generation of a torque include a width substantially equal to the width of each pole of the field magnet 33, as shown in FIG. 9. A cogging (reluctance) generating magnetic plate 34 made of an iron plate or the like which will be hereinafter described in detail is secured, for example, by adhesion, to a lower face of the printed circuit board 26. In particular, referrng to FIG. 9, the magnetic plate 34 is in the form of an approximately sector-shaped frame in plan having a width substantially equal to the width of each magnet pole of the field magnet 33, that is, a width of 90 degrees because the field magnet 33 has 4 magnet poles. The magnetic plate 34 is located on the printed circuit board 26 such that the center radial line 35 between the width thereof is displaced by about three fourths of the width of each pole of the field magnet 33, that is, by an angle of 67.5 degrees, from one 25b of the magnetically active conductor portions 25a, 25b of the armature coil 25-2 (which may be otherwise 25-1 or else both 25-1 and 25-2). The cogging generating magnetic plate 34 has a perforation 36 formed therein so that the screw 28 may extend therethrough.

Electronic parts of an energization controlling circuit such as a transistor 37 and a resistor 38 are located at a portion of the lower face of the printed circuit board 26 of the stator armature 27 other than the portion opposing to the cogging generating magnetic plate 34 and the portions opposing to the armature coils 25-1, 25-2, as seen in FIG. 6. Meanwhile, a position-detecting element 39 which may be a Hall element or a Hall IC is located just below the magnetically active conductor portion 25a of the armature coil 25-1.

It is to be noted here that since circumferentially extending conductor portions 25c, 25d of the armature coils 25-1, 25-2 do not contribute to generation of a torque, the field magnet 33 may have a smaller outer radius by the width (radial dimension) of the outer conductor portion 25d. It is also to be noted that the magnetically active conductor portions 25a and 25b of the armature coils 25-1, 25-2 include an angle of 90 degrees because the field magnet 33 has 4-poles as described above. Further, while in the motor FM of the embodiment, two armature coils 25-1, 25-2 are located in symmetrical positions in order to reduce rotational vibrations, otherwise a single armature coil may be included in a motor.

Thus, for example, upon stopping or starting of the motor, the field magnet 33 is normally at a position advanced substantially by one fourth of the width of each pole of the field magnet 33 (that is, by an angle of 22.5 degrees because the field magnet 33 in the present embodiment has 4 poles) from a position corresponding to the magnetically active conductor portion 25b of the armature coil 25-1 or 25-2 relative to the direction of rotation (as indicated by an arrow mark A) as seen from FIG. 9 because the cogging generating magnetic plate 23 is located at such a specific position as described above on the printed circuit board 26 of the stator armature 27. In order words, where the cogging generating magnetic plate 24 is located at the specific position, the field magnet 33 will stop at a position in which any of the N and S poles thereof is opposed to the magnetic plate 34 by attraction thereof. Accordingly, when the field magnet 33 is in a stopped condition, the position-detecting element 39 always detects an N or S pole of the field magnet 33 and hence does not detect a dead point, and therefore, the field magnet 33 can be rotated continuously in a predetermined direction if the armature coil 25-1 or 25-2 is suitably energized by electric current flow in a predetermined direction.

Although the provision of the cogging generating magnetic plate 34 on the printed circuit board 26 will cause generation of cogging, according to the present invention, such a cogging torque by the magnetic plate 34 is effectively utilized to attain continuous rotation of the motor. Accordingly, only one position-detecting element is sufficient for the motor, and as a result, an inexpensive 1-phase disk-type brushless motor or disk-type brushless fan motor can be obtained.

It is to be noted that while the magnetic plate 34 mounted on the printed circuit board 26 is provided to allow self-starting of the rotor at any time, the location thereof as such that the magnetic plate 34 is in an opposing face-to-face relationship to equal areas of two adjacent N and S poles of the field magnet 33 while assuring such self-starting of the field magnet 33.

Thus, a 1-phase disk-type brushless motor or brushless fan motor which can start itself can be obtained by provision of the magnetic plate 34 at such a specific location to generate a cogging torque. However, if the magnetic plate 34 has such a full width as indicated by a broken line 40, the cogging torque will rise and/or drop suddenly, and accordingly the motor will not rotate smoothly.

Therefore, according to present invention, the cogging generating magnetic member 34 is further cut away as indicated by a solid lien 41 such that the volume and area thereof gradually decreases from one end 34a thereof located nearer to the magnetically active conductor portion 25b of the armature coil 25-1 which is located nearest thereto in the direction of rotation of the rotor (in the direction of the arrow mark A) to the other end 34b thereof.

By this means, the cogging torque will increase gradually and then a maximum starting torque will be obtained. Accordingly, the motor can generally rotate smoothly and turning noises caused by the cogging torque will be reduced, composed to a conventional motor.

Figure 11:
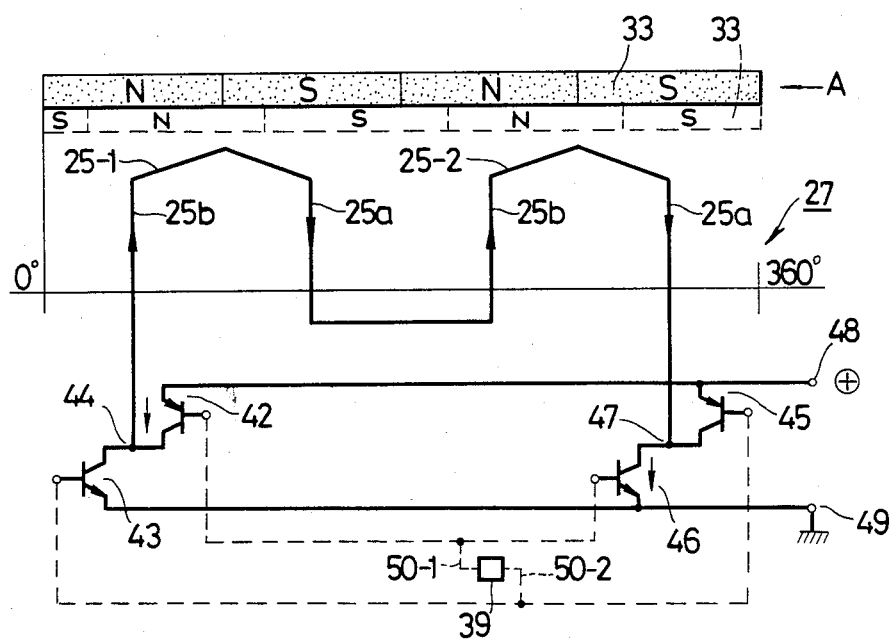
FIG. 11 is a developed view of the field magnet of FIG. 10 and the stator armature of FIG. 9.

Reference is now had to FIG. 11 which is a developed view of the field magnet 33 and the stator armature 27 in the 4-pole, 2-coil, 1-phase reciprocally energized brushless (fan) motor. The magnetically active conductor portions 25a, 25b of the armature coils 25-1, 25-2 which contribute to generation of a torque are located in an equidistantly spaced relationship by an electrical angle of 180 degrees (which correspond to a mechanical angle of 90 degrees in the present embodiment). One of two terminals of the magnetically active conductor portion 25a of the armature coil 25-1 and the other of terminals of the magnetically active conductor portion 25a of the armature coil 25-2 are connected in common while the other of terminals of the magnetically active conductor portion 25b of the armature coil 25-1 is connected to a junction point 44 between the collector of a transistor 42 and the emitter of another transistor 43 both of the energization controlling circuit, and one of terminals of the magnetically active conductor portion 25a of the armature coil 25-2 is connected to a junction point 47 between the collector of a transistor 45 and the emitter of another transistor 46. The energization controlling circuit is constructed as a 1-phase reciprocating energization controlling circuit. The emitters of the transistors 42, 46 are connected to a positive power supply terminal 48 while the emitters of the transistors 43, 46 are grounded as at 49.

Output terminals 50-1, 50-2 of the position detecting element 39 are connected to the energization controlling circuit. Accordingly, if the position-detecting element 39 detects an N pole of the field magnet 33, a signal is coupled from the output terminal 50-1 of the position detecting element 39 to render the transistors 42, 46 conductive to cause electric current flow in directions indicated by respective arrow marks through the armature coils 25-1, 25-2. As a result, a turning force in a direction indicated by an arrow mark A is produced. On the contrary, if the position-detecting element 39 detects an S pole of the field magnet 33, a signal is coupled from the output terminal 50-2 of the position detecting element 39 to render the transistors 43, 45 conductive to cause electric current flow in directions opposite to the directions indicated by the respective arrow marks through the armature coils 25-1, 25-2. As a result, a turning force in the direction indicated by the arrow mark A is produced again.

It is to be noted that the position of the field magnet 33 shown by a solid line in FIG. 11 indicates a position in which a maximum starting torque can be obtained while the position shown by a broken line indicates a position at which a cogging torque is generated. As can be apparently seen from FIG. 11, a cogging torque will first be generated at the broken line position of the field magnet 33 and a little later the field magnet 33 will be brought to the solid line position at which a maximum starting torque is generated. Accordingly, a 1-phase disk-type brushless motor or brushless fan motor of a good performance which is low in loss upon starting can be obtained.

Figure 12:
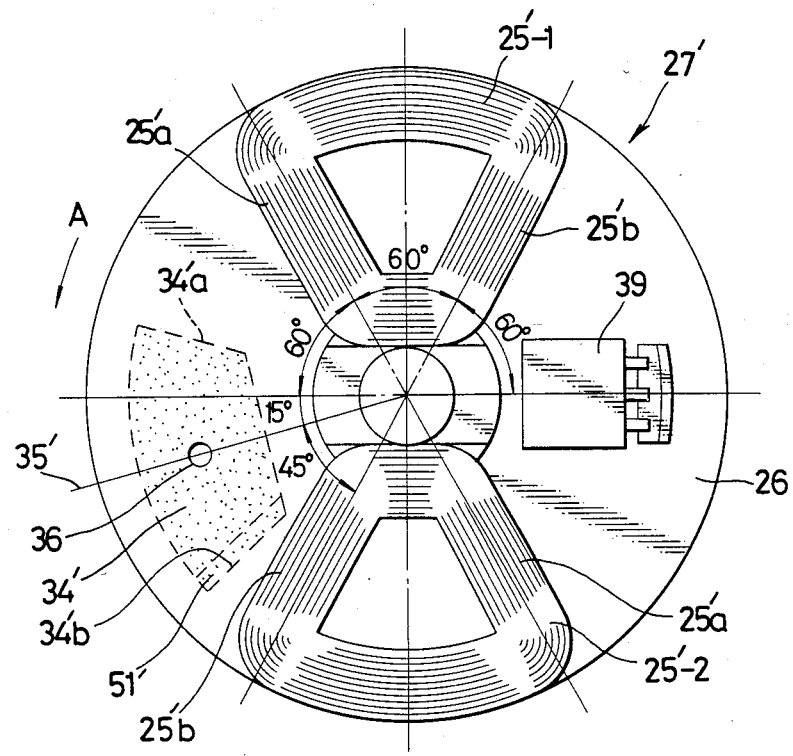
FIG. 12 is a plan view of a stator armature of a disk-type brushless motor according to a second embodiment of the invention.
Figure 13:
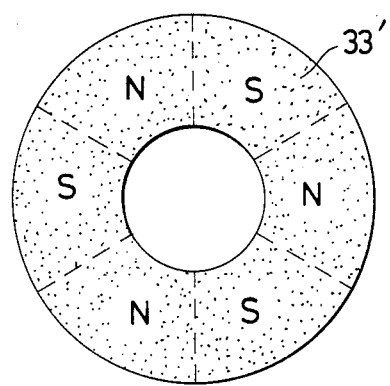
FIG. 13 is a bottom plan view of a 6-pole field magnet.
Figure 14:
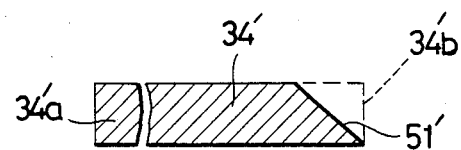
FIG. 14 is a vertical sectional view, in a somewhat enlarged scale, of a cogging generating magnetic plate.

A second embodiment of the present invention will now be described with reference to FIGS. 12 to 15. FIG. 12 is a plan view of a stator armature 27' in which a 6-pole annular field magnet 33' of FIG. 13 is used. Armature coils 25'-1, 25'-2 are approximately sector-shaped, and the magnetically active conductor portions 25'a, 25'b which contribute to generation of a torque include a width of 60 degrees. The armatures 25'-1, 25'-2 are located in a symmetrical relationship at two displaced positions spaced by an angle of 180 degrees on a printed circuit board 26. A cogging generating magnetic plate 34' having a width of 60 degrees is securely mounted on an upper face of the printed circuit board 26 and located at such a position that the center radial line 35' thereof is spaced by three fourths of the width of each pole of the field magnet 33', that is, by an angle of 45 degrees or so, from the magnetically active conductor portion 25'b of the armature coil 25'-2, as seen from FIG. 12.

A position detecting element 39' is located at a mid position between the magnetically active conductor portion 25'b of the armature coil 25'-1 and the magnetically active conductor portion 25'a of the armature coil 25'-2 on the printed circuit board 26.

In the present embodiment, the magnetic plate 34' is not shaped so as to gradually decrease the area and volume thereof from one end 34'a to the other end 34'b thereof as in the first embodiment described above but has a tapered face 51' formed at the other end 34'b thereof so as to decrease the volume at the end 34'b thereof in order that the cogging torque generated may decrease moderately.

Where the position detecting element 39 is located at such a specific position on the printed circuit board 26 as described above, the magnetic plate 34' is not located at a position on the printed circuit board 26 opposing to the position-detecting element 39. Accordingly, terminals of the bottom face of the printed circuit board 26.

Figure 15:
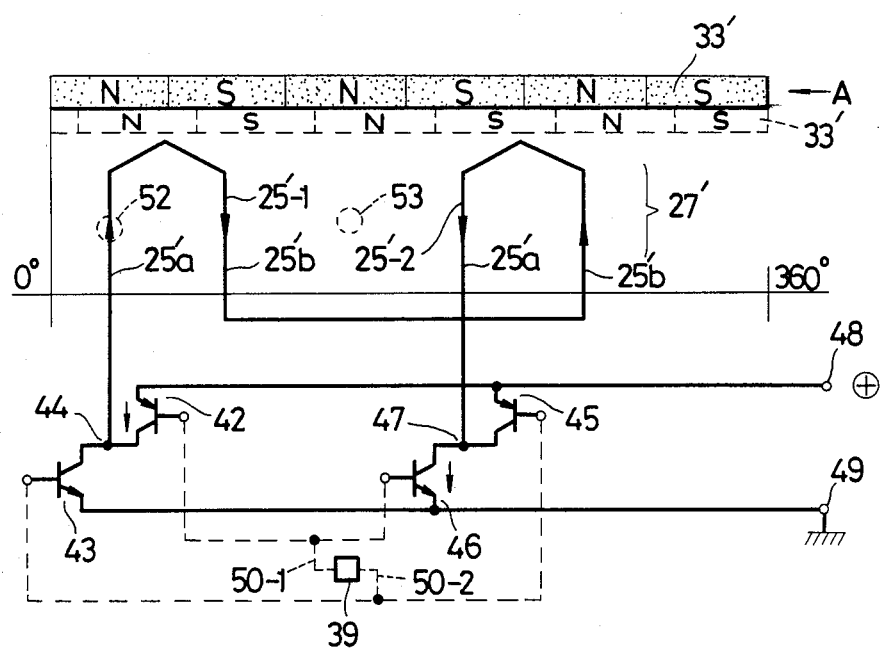
FIG. 15 is a developed view of the stator armature of FIG. 12 and the field magnet of FIG. 13.

FIG. 15 is a developed view of the field magnet 33' and the stator armature 27'. As seen in FIG. 15, the position detecting element 39 which should be located at a position, for example, at a position indicated by a circle 52 of a broken line, on the printed circuit board 26 opposing to the magnetically active conductor portion 25'a of the armature coil 25'-1 is here located at a corresponding same phase position on the printed circuit board 26 as is indicated by another broken line circle 53 (also refer to FIG. 12).

It is to be noted that, while the motor of either of the embodiments described above includes a 4- or 6-pole field magnet 33 or 33' and two armature coils 25-1, 25-2 or 25'-1, 25'-2, it may otherwise include a single armature coil or three or more armature coils.

Meanwhile, where a 6-pole field magnet 33' is employed, three armature coils may be disposed in an equidistantly spaced relationship. Otherwise, where an 8-pole field magnet is used, four armature coils may be disposed in an equidistantly spaced relationship.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. A 1-phase energized disk-type brushless motor of the type which does not include a stator yoke, comprising:
    a rotor comprising a field magnet having 2P alternate north and south poles of essentially equal circumferential pole width, P being an integer than 1;
    a printed circuit board disposed with a surface thereof opposite one side of said field magnet with an axial air gap left therebetween;
    at least one coreless armature coil disposed at the same phase positions on said surface of the printed circuit board, said armature coil having magnetically conductive portions which produce torque on the rotor;
    an undivided cogging generating magnetic element located on said surface of the printed circuit board and having a width which is substantially equal to the circumferential pole width; and
    a single position detecting element for detecting each pole of said field magnet;
    wherein the cogging generating magnetic element has an axial center line which is spaced by distance substantially equal to three fourths of the circumferential pole width from a position at which a maximum starting torque can be generated, said cogging generating magnetic element being shaped such that the volume thereof gradually increases in the direction of rotation of the rotor.

2. A 1-phase energized disk type brushless motor as claimed in claim 1, wherein the surface area of the cogging generating element gradually increases in the direction of rotation of the rotor.

3. A 1-phase energized disk-type brushless motor as claimed in claim 1, wherein one end of the cogging generating magnetic member is tapered so that the volume thereof gradually decreases in the direction of rotation of the rotor.

* * * * *